UNITED STATES PATENT OFFICE.

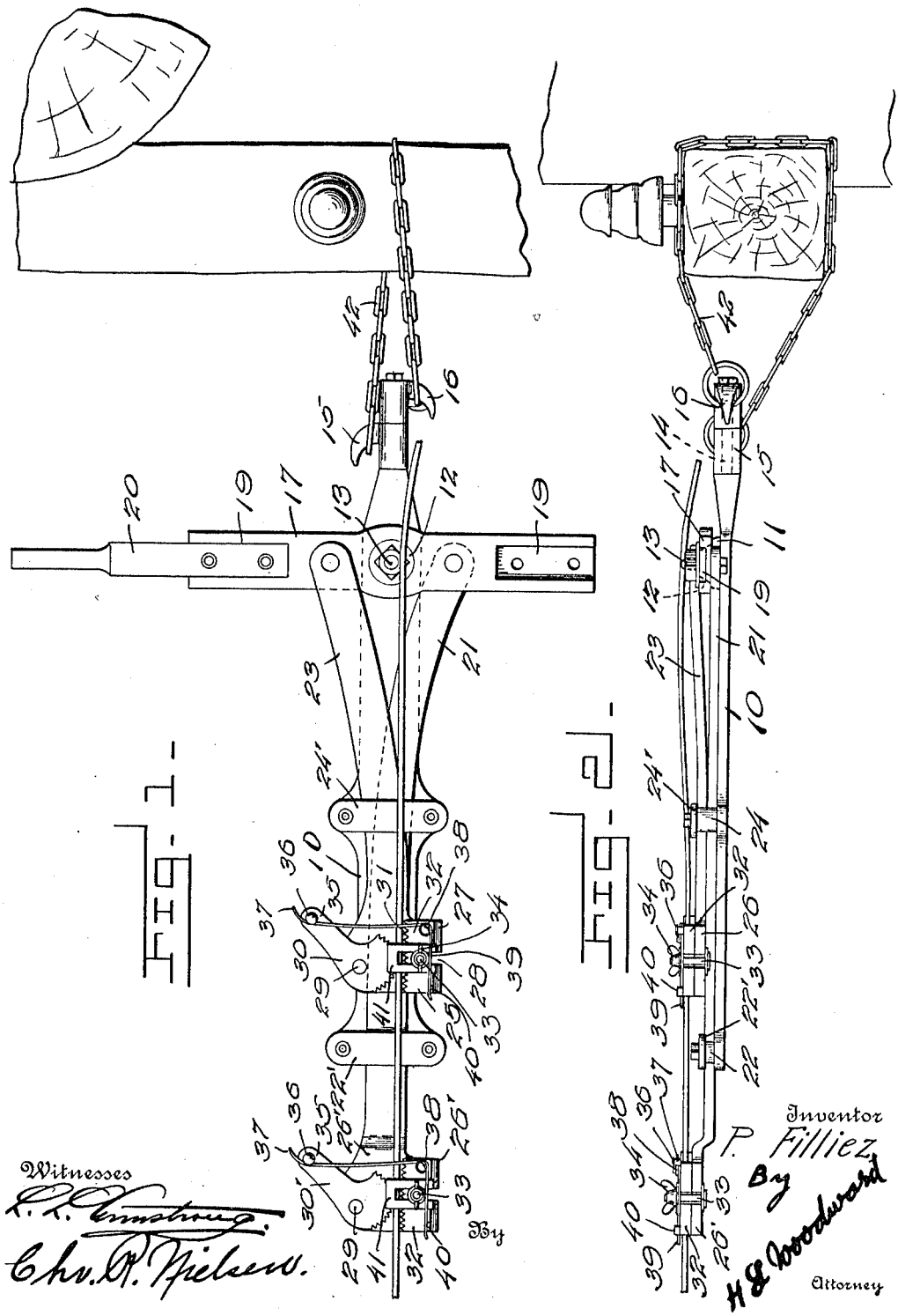

PETER FILLIEZ, OF CANTON, OHIO.

WIRE-STRETCHER.

1,074,084. Specification of Letters Patent. Patented Sept. 23, 1913.

Application filed November 3, 1911. Serial No. 658,410.

*To all whom it may concern:*

Be it known that I, PETER FILLIEZ, a citizen of the United States, residing at Canton, in the county of Stark and State of Ohio, have invented new and useful Improvements in Wire-Stretchers, of which the following is a specification.

This invention relates to wire stretchers suitable for use in laying telegraph lines where an especially light but powerful device is required on account of the fact that the implements have to be ported often for considerable distances, and considerable force is necessary to maintain the wires at proper tension while being secured.

It is an important object of the invention to provide a novel and efficient form of gripping means adaptable to various sizes of wire. A further very important object is to make it possible to engage the stretcher with the cross arm of a telephone pole to stretch and hold a wire while it is secured to the usual insulator upon the arm, without interference with the work.

It is also an important aim to enable the use of the device on each side of a pole with equal facility, and allowing it to be operated always on whichever side is toward the pole, to which the lineman usually clings while performing the work. Thus the workman does not have to assume more dangerous positions for the operation of the stretcher than are necessary for the performance of his regular work in securing the wires in place.

It is another object to arrange for the secure retention of a wire in proper position in the gripping devices after adjustment, for, owing to the awkward positions the lineman is often forced to assume when at the head of a pole, it is often impossible to handle the device in such a way as to allow the wire to feed straight thereto.

Other details of this invention are covered by my application filed March 26th, 1912, Serial Number 686,296.

A further object is to make it possible to operate the device entirely with one hand, and other objects and advantages may be apparent from the following specification and the drawings, in which—

Figure 1 is a top view of the device engaged with a cross arm, Fig. 2, is a side view thereof.

There is illustrated a stretcher comprising the shank 10 having the enlarged boss 11 adjacent one end, with the reduced slightly conical pivot bearing 12 outwardly of the boss and concentric therewith, a threaded stem 13 extending up from the bearing. Projecting longitudinally from this end of the shank there is a reduced stem 14, upon which there are swiveled the two anchor hooks 15 and 16, the latter being the outer one, and each being independently movable. A lever 17 is centrally pivoted on the bearing 12, being held by means of a nut engaged with the stem 13. Each end of the lever is socketed as at 19, to receive detachably an operating handle 20, as shown.

It will be seen that the lever 17 is spaced from the adjacent surface of the shank 10, so that a link 21 connected pivotally to the lever on its inner side may reciprocate freely upon the adjacent side of the shank. This link projects longitudinally beyond the end of the shank farthest from the lever, and carries a grip device to be subsequently described. The said end of the shank is broadened and provided with standards 22 across which a retaining cross piece 22' is secured, whereby the link is held slidably upon the shank. A second link 23, shorter than the one 21 is connected to the lever on its outer side, and also on the opposite side of the lever pivot from the connection of the first link. This second link is held slidably in superposition on the first link by means of standards 24 and cross piece 24' similar to those 22 and 22', and arranged in similar relation to the shank intermediately of its length.

An important feature to be noted here is the fact that the standards are spaced transversely a greater distance than the breadth of the links, so that the latter have a considerable amount of play transversely of the shank in one direction, while the cross pieces 22' and 24' hold them securely against transverse movement to and from the shank. The allowance of this play overcomes or obviates a large amount of friction in the engagement of the device with wire in operation, as will be subsequently explained.

Each of the links is provided at its free extremity with a grip device 25. The link 23 has an extension 26 projecting laterally therefrom in the plane of the link and serrated at 27 on its upper side forming ribs and grooves parallel to the link. This extension is divided in two by a slot 28 transverse to the link and opening on the upper and lower faces of the extension and on its outer edge. Spaced inwardly from the slot on the upper side of the link there is a pivot pin 29 pivoted upon which there is a cam dog 30 arranged to bear against the roughened adjacent face 31 of an adjustable block 32 serrated on its under side to fit snugly upon the extension 26, and having a bolt 33 therethrough disposed slidably in the slot 28 and engaged with a wing nut or equivalent 34, whereby the block is securely held in adjusted position on the extension in proper relation to the dog to coengage therewith upon an interposed wire of any thickness. The face 31 of the block extends longitudinally of the link, and the enlarged portion of the dog—the periphery of which is suitably roughened—is disposed inwardly of the pivot so that a wire tending to pass outwardly between the dog and block will be engaged bindingly and wedged therebetween. The dog is provided with an arm 35, extending laterally from the shank and having a headed pin 36 on its upper side adjacent its extremity borne upon by the arm 37 of a wire spring having a helix 38 set upon a suitable pin carried by the block 32 the opposite end of the wire being extended to form an arm 39 engaged against a lug 40 on the block whereby the arm 37 is caused to exert force upon the dog to cause it to engage properly upon wire in the device. The arm 37 projects somewhat beyond the pin 36, whereby it is adapted to serve as a retainer for wire engaged in the grip, preventing the wire from moving laterally from between the dog and block; its release being effected by lifting the arm manually out from under the head of the pin, when it will move from over the wire, allowing its ready displacement. The wire spring may of course be secured suitably against casual displacement from the block by pressure of a wire being stretched.

For the secure retention of very heavy wire, or where the arm 37 is likely to be too weak or light, I provide the retaining plate 41 longitudinally slotted and held adjustably upon the block by the bolt 33. The slot in the plate allows it to be projected across the space between the block and dog or withdrawn as desired.

The construction of the grip device at the outer end of the link 21 is the same as that described on the link 23, except that the jaw, 26', is offset upwardly to lie in the plane of the link 23, and the dog 30' is correspondingly thickened for the proper performance of its functions.

In use, the hooks 15 and 16 are turned to such positions as to best engage the body to which the device is to be anchored, and are presented thereagainst on the side opposite that from which the wire is drawn. The wire to be stretched may be engaged between the dogs and blocks before or after this adjustment or anchorage of the device, as may be found most convenient. The handle 20 is engaged with the lever at the end most convenient for the operation of the device, and by oscillation the wire is drawn upon alternately by the grip devices, as will be readily understood.

A chain 42 is shown secured by one end to one of the hooks, and may be utilized to secure the device by being passed around a cross arm or other object and the proper links engaged with one of the hooks to hold it properly.

The lever 17 may be cast, and the sockets at each end may be provided with coarse threads, whereby the end of the handle may be similarly shaped and quickly screwed into or unscrewed therefrom, though any suitable form of securement may be employed.

It will be apparent that the device is also readily applicable to use in stretching fence wires or the like, without change.

The adjustable feature of the grips is especially advantageous in permitting the stretching of heavy trolley wires or the lightest telephone wires with the same implement.

Attention is called to the fact that the hooks 15 and 16 may be used without the chain by being engaged directly with the cross arm.

In operation of the device, as first one grip and then the other draws upon the wire, the direction of pull changes from one side to the other of the shank 10. If the ends of the links were held rigidly in alinement with the shank the wire would bear forcibly against the serrated surface of the outwardly moving dog or block but as the links have free movement over a sufficient distance, the dog or block against which the wire bears in its transverse movement will yield or move, with the supporting link, so that a minimum of friction is thereby produced and the grip passes easily along the wire.

What is claimed is:

1. A device of the class described comprising a body member, an anchoring means thereon, a lever centrally pivoted thereon, links pivoted on opposite arms of the lever, extending in a common direction and slidable longitudinally on the body member in superposed relation, spaced standard members on the body without the links for lateral movement of the links as described, means to hold the links slidably upon the body, one of the links being longer than the other, and wire grip means carried by each for the purpose described.

2. A device of the class described comprising a body member, an anchoring means therefor, a lever centrally pivoted thereon, a transverse guide passage being formed on the body member outwardly of the lever in or parallel to the plane of its oscillation, links connected to respective arms of the lever, the outer portions being commonly engaged through the guide passage for sliding movement therein under operation of the lever, and grip devices carried at the outer ends of the links, one link being longer than the other.

3. A device of the class described comprising a body member, anchoring means therefor, a lever centrally pivoted thereon, an inner guide passage formed on the body outwardly of the lever, a short link pivoted on one arm of the lever and extended through the guide passage, a second guide passage outwardly of the link, and a second link pivoted on the other arm of the lever and engaged slidably through the passages, each link having grip means at its outer end, the passages being wider than the links, whereby lateral oscillation thereof is permitted with respect to each other and to the body member.

4. A device of the character described comprising a body member, anchoring means therefor, a lever centrally pivoted thereon, transversely extending guide means on the body outwardly of the lever, and in the plane of oscillation of the lever, links pivoted on respective arms of the lever and extending toward one side thereof, their outer portions being slidably engaged through the guide means for relative sliding movement under operation of the lever, the levers being curved outwardly in respective directions, and grip means carried at their outer ends.

In testimony whereof I have hereunto set my hand in presence of two subscribing witnesses.

PETER FILLIEZ.

Witnesses:
　JOHN McCOSTA,
　GUS MENEGAY.

---

Copies of this patent may be obtained for five cents each, by addressing the "Commissioner of Patents, Washington, D. C."